Figures 1, 2:
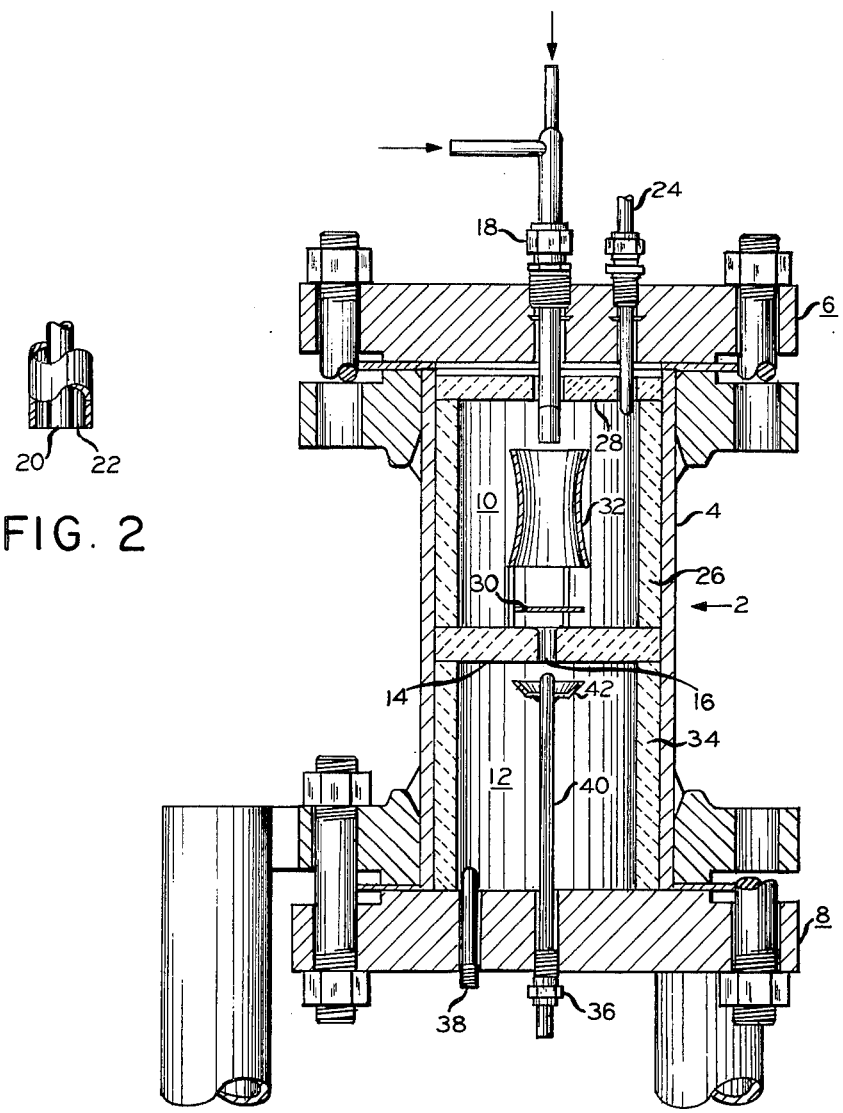

United States Patent [19]

Louthan et al.

[11] 4,022,582
[45] May 10, 1977

[54] CORROSION-RESISTANT REACTOR SUITABLE FOR HIGH TEMPERATURE/HIGH PRESSURE OPERATION

[75] Inventors: Rector P. Louthan; Donald H. Kubicek, both of Bartlesville, Okla.

[73] Assignee: Phillips Petroleum Company, Bartlesville, Okla.

[22] Filed: Jan. 12, 1976

[21] Appl. No.: 648,447

[52] U.S. Cl. .................................. 23/290; 23/284; 23/285; 23/277 R; 260/609 R; 23/252 A
[51] Int. Cl.² ............................................. B01J 3/04

[58] Field of Search ........ 23/290, 285, 284, 277 R; 261/17, DIG. 9; 208/48 Q; 260/679 R, 609 R

[56] References Cited
UNITED STATES PATENTS

| 2,529,598 | 11/1950 | Deanesly | 23/277 R X |
| 2,790,838 | 4/1957 | Schrader | 260/679 |
| 3,522,017 | 7/1970 | Barfield, Jr. | 23/277 R |

Primary Examiner—James H. Tayman, Jr.

[57] ABSTRACT

A corrosion-resistant reactor suitable for high temperature/high pressure operation consisting essentially of ceramic-lined reaction and quench chambers.

5 Claims, 2 Drawing Figures

CORROSION-RESISTANT REACTOR SUITABLE FOR HIGH TEMPERATURE/HIGH PRESSURE OPERATION

This invention relates to apparatus for use in high temperature chemical processes.

Several processes are known in the art wherein two or more reactants are reacted in the vapor phase at an elevated temperature and wherein at least one reaction product or intermediate is highly corrosive. For example, in the vapor phase reaction of hydrogen sulfide with an aromatic halide to form an aromatic thiol, the co-product hydrogen halide is highly corrosive to ordinary materials of construction at the high temperatures employed for this reaction.

It is an object of this invention to provide a corrosion-resistant reactor apparatus.

Other objects, aspects and advantages of this invention will be readily apparent to those skilled in the art from the reading of the following disclosure.

The invention will be more readily understood by reference to the drawings, of which FIG. 1 is a cross-sectional view of a high temperature, high pressure corrosion resistant reactor and FIG. 2 is a cross-sectional view of a multi-fluid nozzle used therein.

FIG. 1 shows a reaction vessel 2 having an outer shell 4 of generally uniform cross section, top closure means 6, bottom closure means 8, and comprising, in axial contiguity, a reaction chamber 10 and a quench chamber 12. The reaction chamber 10 and the quench chamber 12 are separated by a partition 14 having an opening 16 to provide communication between the reaction chamber 10 and the quench chamber 12.

The top closure means 6 is adapted with inlet means 18 for simultaneously introducing at least two reactants into the reaction chamber 10. In a presently preferred embodiment, the inlet means 18 comprises a concentric multifluid nozzle FIG. 2, wherein the numeral 20 designates a first reactant charge tube and the numeral 22 designates the annular space surrounding the charge tube 20 and the outside of the nozzle for a second reactant. Other suitable configurations for the inlet means 18 will be apparent to those skilled in the art. Referring again to FIG. 1 the top closure means 6 can also be adapted with means for measuring the reaction temperature within the reaction zone 10. The numeral 24 designates thermocouple means for measuring such temperature.

The side wall of the reaction chamber 10 is lined with a ceramic liner 26, suitable for maximum operating temperature of about 2500° F. Liner 26 is a preformed refractory such as "Alundum AN 485," available from the Norton Company, Worcester, Mass. The upper portion of the reaction chamber 10, defined by the top closure 6, is lined with a ceramic liner 28. Liner 28 is a castable insulation such as "Alundum Castable Cement CA 334," available from the Norton Company, Worcester, Mass., suitable for operating temperatures of about 3300° F.

A baffle means 30 is positioned within the reaction chamber 10 above the opening 16 in the partition 14 to prevent the reactants from passing directly into the quench chamber. The reactants impinge upon the baffle means 30 and are directed upwardly into the reaction chamber 10. Optionally, a venturi 32 can be positioned above the baffle means 30 to provide better mixing of the reactants. The baffle means 30 and the venturi 32 are constructed of a material capable of withstanding the high reaction temperatures employed. Preferably, the venturi 32 and the baffle means 30 are constructed as a unit. One suitable material of construction is quartz, although other suitable materials may be apparent to those skilled in the art.

The partition 14 is formed from a castable insulation such as "Alundum Castable Cement CA 334."

The side wall of the quench chamber 12 is lined with a ceramic liner 34, of construction similar to that of the reaction chamber liner 26.

The bottom closure means 8 is adapted with quenching means 36 and outlet means 38. The quenching means 36 comprises a quench tube 40 which extends upwardly into the quench chamber 12 to a point below the opening 16 in partition 14. Optionally, the quench tube 40 has a deflector plate 42 positioned slightly below the tip of the tube 40 so as to provide intimate mixing of the quenching liquid and the hot gases passing through the opening 16 into the quench chamber 12.

The reaction apparatus of the present invention is useful in high temperature reactions wherein at least one of the reactants, the products or intermediates, is corrosive to ordinary materials of construction. Illustrative of such reactions is the reaction of an aromatic halide with hydrogen sulfide to form the corresponding mercaptan, or with steam to form the corresponding phenol. Suitable aromatic reactants include aromatic halides, alkyl-substituted aromatic halides, aromatic dihalides, phenolic halides, and the like. The reaction apparatus can also be used for the cleavage of aromatic thioethers, as disclosed by Sherk et al, U.S. Pat. No. 3,799,989. The reaction apparatus is particularly suitable for the reaction of chlorobenzene and hydrogen sulfide at an elevated temperature, to form thiophenol. It will be appreciated by those skilled in the art that the exact sizing of the reactor is dependent upon a number of interrelated factors, including reaction temperature, pressure, residence time, desired degree of conversion and selectivity to the desired product and the like.

In general, the reaction 10 and quench 12 chambers will have a height to inside diameter ratio in the range of 1:1 to 5:1. The opening 16 in the partition 14 has a minimum size such that the reaction mixture in the reaction chamber 10 can pass into the quench chamber 12 to avoid flooding the reaction chamber 10. The maximum size of the opening is such that the desired residence time of the reactants in the reaction chamber is not decreased. In general, the diameter of the opening 16 is in the range of 0.05 to 0.15 times the inside diameter of the reaction chamber 10.

The reaction apparatus of the present invention can be used at elevated temperatures of up to about 1500° F or greater and pressures of about 200 to 400 psig or greater.

Reasonable variations and modifications, which will be apparent to those skilled in the art, can be made in this invention without departing from the spirit and scope thereof.

What is claimed is:

1. A high temperature reaction apparatus consisting essentially of a vessel having an outer shell of generally uniform cross-section, top closure means, bottom closure means and comprising, in axial contiguity, a reaction chamber and a quench chamber, said reaction chamber and said quench chamber being separated by a partition having an opening to provide communication therebetween,
said top closure means being adapted with inlet means for simultaneously introducing at least two reactants into said reaction chamber,
wherein the side wall of said reaction chamber is lined with a ceramic material and wherein the upper portion of said reaction chamber, defined by said top closure, is lined with a ceramic material,
baffle means positioned within said reaction chamber above said opening in said partition and a venturi mixer positioned within said reaction chamber above said baffle means,
wherein the side wall of said quench chamber is lined with a ceramic material,
said bottom closure means being adapted with quenching means and oulet means, said quenching means comprising a quench tube extending upwardly into said quench chamber to a point below said opening in said partition, said quench tube having an overflow reservoir to maintain a pool of quench medium therein.

2. The reactor of claim 1 wherein said inlet means is centrally positioned in said top closure means, said opening in said partition is centrally located in said partition, and said quench means is centrally located in said quench zone.

3. The apparatus of claim 1 wherein said reaction chamber has a height to inside diameter ratio of 1:1 to 5:1.

4. The apparatus of claim 1 wherein said quench chamber has a height to inside diameter ratio of 1:1 to 5:1.

5. The apparatus of claim 1 wherein said opening in said partition has a diameter in the range of 0.05 to 0.15 times the inside diameter of said reaction chamber.

* * * * *